United States Patent [19]

Asano et al.

[11] Patent Number: 4,492,884
[45] Date of Patent: Jan. 8, 1985

[54] POROUS FILL STATOR OF A CANNED MOTOR

[75] Inventors: Etuo Asano, Sakura; Yasuro Suzuki, Narashino; Nobuo Midou, Funabashi, all of Japan

[73] Assignee: Hitachi, Ltd., Tokyo, Japan

[21] Appl. No.: 443,400

[22] Filed: Nov. 22, 1982

[30] Foreign Application Priority Data

Nov. 26, 1981 [JP] Japan ................................ 56-188370

[51] Int. Cl.[3] ............................................... H02K 1/04
[52] U.S. Cl. .................. 310/45; 264/272.13; 264/272.2; 310/88
[58] Field of Search ........... 264/272.19, 272.2, 272.13, 264/123; 310/43, 45, 87, 88

[56] References Cited

U.S. PATENT DOCUMENTS

| | | | |
|---|---|---|---|
| 3,283,187 | 11/1966 | Schaefer | 310/87 |
| 3,638,055 | 1/1972 | Zimmermann | 264/272.19 |
| 3,688,137 | 8/1972 | Filhol | 310/45 |
| 3,778,493 | 12/1973 | Shaw | 264/123 |
| 3,874,073 | 4/1975 | Dochterman et al. | 264/272.19 |
| 4,000,236 | 12/1976 | Redfarn et al. | 264/123 |
| 4,243,623 | 1/1981 | Sprengling et al. | 264/272.19 |

*Primary Examiner*—J. D. Miller
*Assistant Examiner*—D. L. Rebsch
*Attorney, Agent, or Firm*—Antonelli, Terry & Wands

[57] ABSTRACT

In a canned motor including a stator with a cylindrical housing, a stator core having a stator winding and mounted on an inner surface of the motor housing, a pair of end brackets each secured to one of two opposite open ends of the motor housing, a cylindrical can mounted on an inner side of the stator core and secured at opposite ends to the end brackets, and a rotor arranged on an inner side of the can, the stator sealed by the can is filled with a porous insulator. The canned motor having the stator provided with the porous insulator is produced by a method wherein a mixture of filler in particulate form and resin in powder form is poured in a space in the stator sealed by the can, and the mixture is heated to allow the resin to cure to form the filler and resin into a porous body, to achieve molding of the stator and provide it with an insulator in the form of the porous body.

3 Claims, 4 Drawing Figures

POROUS FILL STATOR OF A CANNED MOTOR

BACKGROUND OF THE INVENTION

This invention relates to stators of canned motors suitable for use in the water and methods of producing same, and, more particularly, to a stator of a canned motor of the type in which the stator is sealed by a can, and insulator material is poured in a space around the stator.

In a motor of the type comprising a stator including a cylindrical motor housing, a stator core having a stator winding wound thereon and fixed on an inner surface of the motor housing in the central portion thereof, and a pair of end brackets each fixed to one of opposite open ends of the motor housing, and a rotor having a rotor core juxtaposed against the stator core, the rotor being located inwardly of the stator and journalled by suitable bearing means for rotation, it has been proposed to provide a canned motor having a cylindrical can located in a position inwardly of the stator. When the can is mounted inside the motor housing, the stator winding can be sealed by the can in the motor housing, so that protection of electrical components inside the motor against water can be advantageously provided for when the motor is used in the water or in high temperature atmosphere. However, no desirable effects could be achieved merely by placing a can inside the motor housing. If a can is merely attached to the inner surface of the stator, the presence of the can would cause air sealed in the stator to be expanded by the heat generated when the motor is actuated, with the result being that the expanded air would cause deformation of the can to take place. When the can is deformed, a problem arises in that the can and the rotor are brought into contact with each other. To obviate the aforesaid problem, it has been proposed to fill the motor housing with insulating material to eliminate air that might otherwise remain inside the motor housing.

Epoxy resin of high thermal deformation temperature has been used as the insulating material to be poured in the motor housing of a canned motor. Pouring of the epoxy resin has been carried out as follows: the epoxy resin, in a liquid state, is poured into the motor housing through a port formed beforehand at one of the end brackets and allowed to cure. In pouring the epoxy resin into the motor housing, the motor housing is evacuated to prevent formation of cavities on the surface of the can which might otherwise occur due to the presence of air in a space around the stator because the temperature inside the motor housing rises on account of the epoxy resin having a high viscosity at room temperature. If evacuation of the motor housing is not satisfactorily effected and cavities containing air therein are formed in the epoxy resin, the residual air would be expanded as the temperature of the stator winding rises and the pressure applied by the expanded air would increase. If this situation occurs, the can would be biased diametrically toward its center, so that the rotor located in the can might be pressed by the can and its operation might be interfered with.

Thus, in the art of pouring an epoxy resin in a liquid state into the motor housing of a canned motor and allowing same to cure, it is essential that a high vacuum be obtained inside the stator when the epoxy resin is poured therein, and the prior art has suffered the disadvantage that the operation of connecting the stator to a vacuum device and the operation of preparing for the pouring of the resin are timeconsuming. An additional disadvantage is that, since the insulating material consists of resin only, it becomes heavy in weight and high in cost.

SUMMARY OF THE INVENTION

An object of the invention is to provide a stator of a canned motor capable of preventing deformation of the can by the heat generated by the stator winding.

Another object is to provide a method of production of the can of the aforesaid type capable of producing it with simple means.

The outstanding characteristic of the stator of the canned motor according to the invention is that when a mixture of filler, in particulate form, and resin, in powder form, is poured in a space in the stator sealed by the can, the mixture is heated and allowed to cure so that the filler and the resin are formed into a porous body, to provide a molded insulating member inside the stator. This allows deformation of the can due to the heat generated by the stator winding to be avoided, and makes it possible to reduce cost while enabling a light weight to be obtained in a stator of a canned motor.

The outstanding characteristic of the method of production of the stator of the aforesaid construction is that the method comprises the steps of filling the space in the stator sealed by the can with a mixture of filler, in particulate form, and resin in powder form, and heating the mixture and allowing same to cure into a porous body. Thus, a molded insulating member for the stator can be produced with simple means.

DETAILED DESCRIPTION OF THE INVENTION

Figure 1:
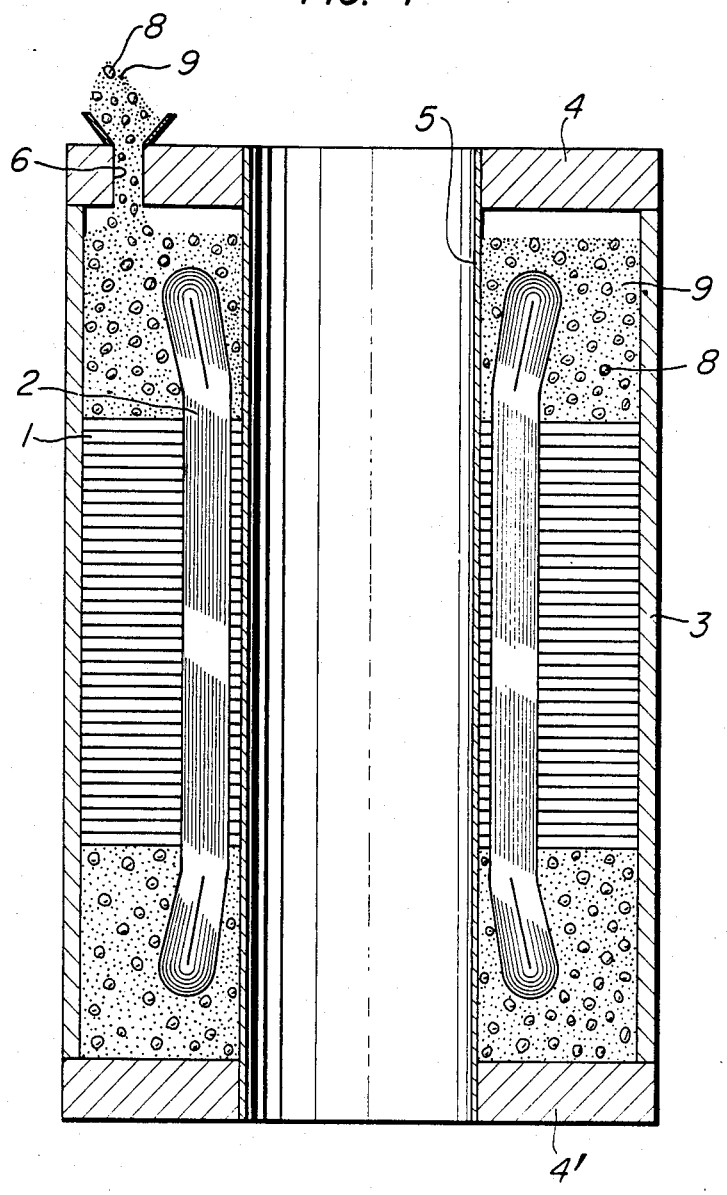
FIG. 1 is a longitudinal cross sectional view illustrating the manner in which a filler in particular form and resin in powder form are poured as a mixture in a stator of a canned motor constructed in accordance with the present invention.
Figure 2:
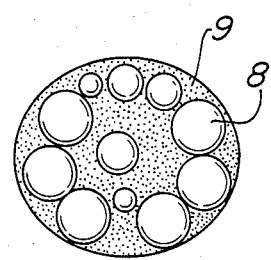
FIG. 2 is a top view of a model depicting a mixture of filler and resin poured into the stator.

As shown in FIGS. 1-4, in producing the stator, a stator core 1 is assembled with a cylindrical motor housing 3 in the central portion of its inner surface. The stator core 1 has a stator winding 2 wound thereon. Then end brackets 4 and 4' are each attached to one of two opposite open ends of the motor housing 3 in which a cylindrical can 5 is mounted in such a manner that it is in intimate contact with the inner surface of the stator core 1. The can 5 is fixed in place by having its opposite ends joined by welding to the end brackets 4 and 4', respectively. A mixture of filler material 8, in particulate form, and resin 9, in powder form, is poured in a space around the stator winding 2 in the stator sealed by the can 5.

In pouring the mixture of the filler material 8 and the resin 9 into the space, the mixture is poured into the space through a port 6 formed beforehand in the end bracket 4 while the mixture is being vibrated, as shown in FIG. 1.

The filler 8 may comprise zirconium silicate, quartz, mica, glass or sand or a mixture of these materials and, preferably, has a grain size in the range between about 0.05 and 0.35 mm. The resin 9 is a thermosetting synthetic resinous material of an epoxy of polyester base and is in the form of a powder.

The mixture of the particulate filler 8 which may, for example, be zirconium silicate, and the powdery resin 9 which may, for example, be epoxy resin, has been found, as a result of experiments, that it optimally contains 3-20 weight parts of resin 9 for 100 weight parts of filler 8 when the following points are taken into consideration; namely, the insulating properties of the mixture as a stator molding insulator; the mechanical strength of the mixture for providing protection to the stator winding 2 and can 5; and the transmittability of air pressure through the mixture at the time of a rise in the temperature of the stator winding 2.

The results of the experiments also show that the filler 8 preferably has a grain size in the range between 0.05 and 0.35 mm and that, when the grain size is smaller than this range, the filler 8 shows a marked reduction in volume when subjected to heating in the next stage. Conversely when the grain size is larger than this range, it is difficult to mix the filler 8 is with the resin 9 in powder form and separation of the filler 8 from the resin 9 may occur when the mixture is poured into the space.

Therefore, in this embodiment the filler 8 of zirconium silicate form spaces and the epoxy resin 9 is to fill the spaces.

As the mixture of the filler 8 and resin 9, selected on these conditions, is poured, the space is filled with the mixture in such a manner that the air in the gaps between the filler 8 in particulate form is replaced by the resin 9 in powder form and the air is released from the space. Thus, when the mixture of the filler 8 and resin 9, according to the invention, is poured in the space around the stator winding 2, the need to evacuate the space can be eliminated because the air in the space around the stator winding 2 in the stator is replaced by the mixture poured into the space, to thereby remove substantially all the air so that almost no air remains.

After the mixture of the filler 8 and resin 9 is poured in the space in the stator, the mixture is heated and allowed to cure.

Figure 3:
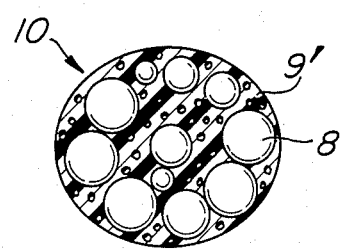
FIG. 3 is a view of the model of FIG. 4 after the mixture has been heated and allowed to cure so as to form a porous body.
Figure 4:
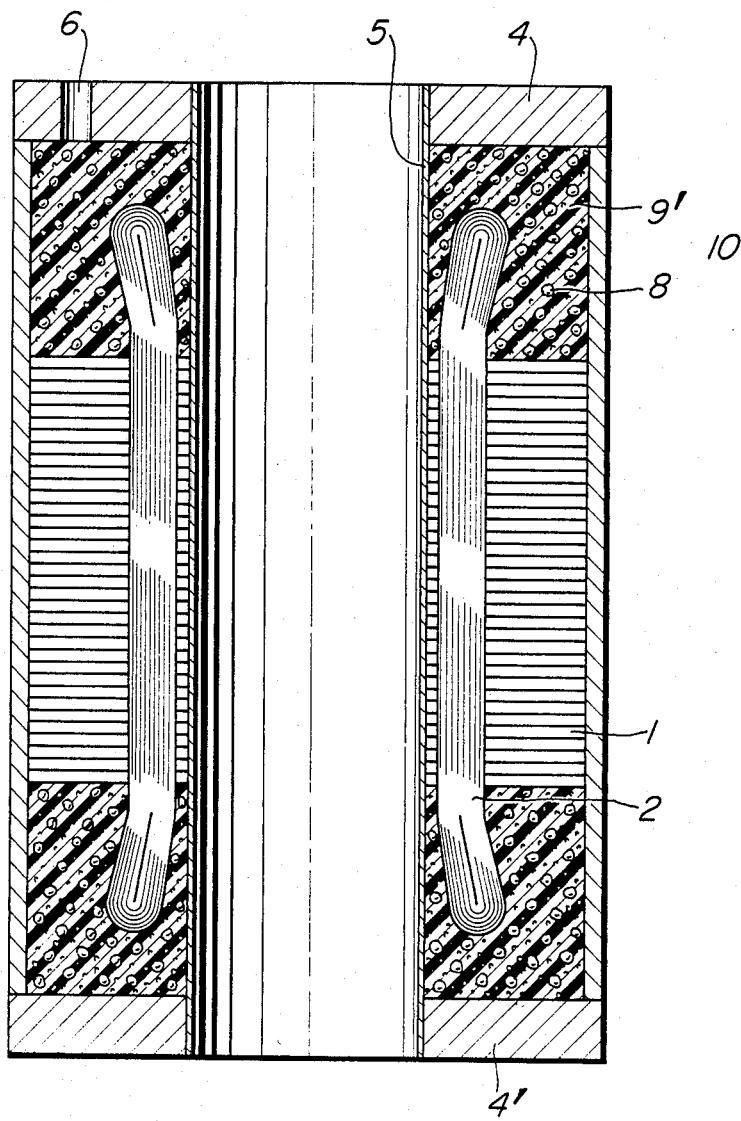
FIG. 4 is a vertical cross sectional view of another stator constructed in accordance with the present invention.

By this treatment, the resin 9 in powder form is melted and cures while its volume is reduced, so that the resin 9 bonds the filler 8 in particulate form together while leaving minute pores between the particles of filler 8. Thus, as shown in FIG. 3, the fused resin 9' and the filler 8 are formed into a porous body serving as a stator molding insulator 10. Even if the epoxy resin 9 arranged between the filler 8 is fused, the volume of the total compound including the resin 9 and the filler 8 may naturally not vary. The port 6 formed in the end bracket 4 for pouring the mixture therethrough is sealed after gas is released therethrough from the motor housing 3, with the gas being generated when the resin 9, in powder form, is heated.

The stator molding insulator 10 which is a porous body formed by the fused resin 9' and filler 8 may be partially heated when the canned motor is in service due to a rise in the temperature of the stator winding 2. However, even if the air around the stator core 2 suffers thermal expansion, the heated air is allowed to flow from a high temperature section to a low temperature section through the pores formed in the insulator 10 between the filler particles 8, so that there is an equilibrium in the pressure of the air and the temperature of the air does not rise to a level sufficiently high to bias the can 5 diametrically toward its center.

The results of tests conducted on the test pieces of the stator molding insulator 10 produced by the aforesaid process are shown in a table below:

TABLE

| Test pieces | No. 1 | No. 2 | No. 3 | No. 4 |
|---|---|---|---|---|
| Zirconium Silicate | 100 | 100 | 100 | 100 |
| Epoxy Resin Powder | 3 | 5 | 10 | 15 |
| Bending Strength (kg/cm$^2$) | 20.2 | 28.7 | 34.7 | 34.9 |
| Filler Separation Rate (%) | 0.39 | 0.49 | 1.00 | 0.85 |

It will be seen in the table that all the test pieces have a bending strength over 20 kg/cm$^2$, the bending strength being used as a representative of mechanical strengths. Such bending strength is high enough for a stator molding insulator to provide protection to the stator winding 2 and can 5. It has been ascertained that even if evacuation of the space in the stator is eliminated when the mixture of the zirconium silicate, in particulate form, and epoxy resin, in powder form, is poured into the space, the filler separation rate is low after the mixture is subjected to heating to allow the resin to cure, to enable a porous body of the mixture of fused and cured epoxy resin and zirconium silicate of high bond strength to be obtained. It has also been ascertained that the insulating body 10 produced by the method according to the invention gives rise to no problem in respect of insulatability.

From the foregoing description, it will be appreciated that according to the invention the need to evacuate the space in the stator by using vacuum means can be eliminated when the mixture of the filler 8, in particulate form, and the resin 9 in powder form, is poured in the space, so that it is possible to obtain a stator molding insulator in a short period of time. This is conducive to production of the canned motors on a mass production basis.

According to the invention, the resin 9 in powder form, is heated and allowed to cure while forming a mixture with the filler 8 in particulate form. Thus, it is possible to reduce the weight of the stator molding insulating as compared with a corresponding insulator of the prior art which is formed of fused resin in the entire structure, and also to reduce the production cost.

According to the method of production provided by the invention, a mixture of the filler 8, in particulate form, and the resin 9, in powder form, is poured in a space in the stator, and the mixture is heated and the resin 9 is allowed to cure to form the filler 8 and resin 9 into a porous body serving as a stator molding insulator. Thus, the invention can achieve the effect of producing the stator molding insulator with simple means.

What is claimed is:

1. A canned motor comprising:
a stator including a cylindrical motor housing, a stator core having a stator winding mounted on an inner surface of said motor housing, a pair of end brackets each secured to one of two opposite open ends of said motor housing, and a cylindrical can arranged on an inner side of said stator core and secured at opposite ends to said end brackets;

a rotor mounted on an inner surface of said can; and a porous insulator located in said stator and sealed by said motor housing, said end brackets and said can, said porous insulator is formed of an inorganic filler in particulate form having a grain size in a range of between 0.05 and 0.35 mm, and a resin having minute pores and connecting filler particles together, the resin is within a range of between 3-20 weight parts for 100 weight parts of the inorganic filler.

2. A canned motor as claimed in claim 1, wherein said filler in particulate form is selected from the group consisting of zirconium silicate, quartz, mica, glass, sand and mixtures thereof.

3. A canned motor according to claim 1, wherein pores in said porous insulator are in communication with each other so as to enable an air flow between high and low temperature sections of the motor.

* * * * *